United States Patent
Bruning et al.

(10) Patent No.: US 6,888,529 B2
(45) Date of Patent: May 3, 2005

(54) CONTROL AND DRIVE CIRCUIT ARRANGEMENT FOR ILLUMINATION PERFORMANCE ENHANCEMENT WITH LED LIGHT SOURCES

(75) Inventors: Gert Bruning, Sleepy Hollow, NY (US); Chin Chang, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 135 days.

(21) Appl. No.: 09/735,151

(22) Filed: Dec. 12, 2000

(65) Prior Publication Data

US 2002/0070914 A1 Jun. 13, 2002

(51) Int. Cl.[7] .................................................. G09G 3/36
(52) U.S. Cl. ........................ 345/102; 345/82; 345/46; 345/88; 349/61
(58) Field of Search .......................... 345/102, 87, 84, 345/46, 82, 83, 44, 88; 315/291, 300, 302; 349/61; 257/88, 89

(56) References Cited

U.S. PATENT DOCUMENTS

| 5,684,368 | A | | 11/1997 | Wei et al. ................... 315/302 |
|---|---|---|---|---|
| 5,724,062 | A | * | 3/1998 | Hunter |
| 5,783,909 | A | * | 7/1998 | Hochstein |
| 5,812,105 | A | | 9/1998 | Van de Ven ................... 345/83 |
| 6,069,676 | A | | 5/2000 | Yuyama ........................ 349/62 |
| 6,111,367 | A | | 8/2000 | Asano et al. ................ 315/291 |
| 6,448,951 | B1 | * | 9/2002 | Sakaguchi et al. |
| 6,618,031 | B1 | * | 9/2003 | Bohn et al. .................... 345/83 |

FOREIGN PATENT DOCUMENTS

| DE | 19848925 A | 4/2000 | .......... H05B/37/02 |
|---|---|---|---|
| EP | 0997868 A1 | 3/2000 | ............ G09G/3/34 |
| GB | 2176042 A | 12/1986 | ............ G08G/3/32 |
| WO | WO9701240 | 9/1997 | .......... H04N/5/222 |
| WO | 0051103 A1 | 8/2000 | ............ G09G/3/32 |

* cited by examiner

Primary Examiner—Matthew C. Bella
Assistant Examiner—Hau Nguyen

(57) ABSTRACT

A backlight for an LCD display comprised of an array of LEDs. The backlight may be driven and controlled by a fast pulse power converter, thus providing a response time for the backlight on the order of microseconds. The backlight may thus be used for image display, for example, in the depiction of images in a video input to the LCD and removal of image artifacts.

20 Claims, 6 Drawing Sheets

CONTROL AND DRIVE CIRCUIT ARRANGEMENT FOR ILLUMINATION PERFORMANCE ENHANCEMENT WITH LED LIGHT SOURCES

FIELD OF THE INVENTION

The invention relates to backlighting of display panels, including the backlighting in LCD panels.

BACKGROUND OF THE INVENTION

A backlight is typically used to illuminate an LCD panel for information display. A typical LCD, such as an active matrix LCD, is comprised of liquid crystal disposed between two substrates. Adjacent to one substrate is a thin film common electrode and adjacent to the other is an array of thin film electrodes. Each electrode in the array is connected to one or more thin active elements and address lines, which serve to regulate the voltage applied to the electrode. The liquid crystal disposed between each pixel electrode and the common electrode comprises a pixel of the LCD. The electrode of the array for a given pixel is referred to below as a "pixel electrode".

In general, liquid crystal of a pixel of an LCD will pass incident light because of a helical alignment of the liquid crystal molecules working in conjunction with other optical elements. When a voltage is applied between a pixel electrode and the common electrode, for example, via the address lines and the active elements, the helical alignment of the liquid crystal is removed or modified and light is impeded or prevented from passing through the pixel.

The liquid crystal itself does not generate light, but instead either passes or impedes the passage of light as described above. Thus, a "backlight" is typically provided for the LCD, which provides light to the pixels of the LCD. Since the backlight is typically a white light source, for a color LCD each "pixel" is generally comprised of three separate pixels or "sub-pixels" covered with a red, green and blue filter. The color displayed by each pixel is controlled by the light emitted by each of the three sub-pixels, which is a function of the voltage between the pixel electrode (or, the "sub-pixel electrode") for each sub-pixel.

The backlight provided to the LCD is, as noted, typically a white light source. It is generally desirable to have as constant an intensity as possible across the LCD panel to present a highly uniform image on the display. FIG. 1 depicts a basic design of a backlight 10 that uses a parabolic reflector 12 with a fluorescent light 14 positioned at the focal point of the reflector 12. The light rays from the light are thus reflected by the reflector 12 normal to a diffusion surface 16, which provides a more uniform distribution of light intensity emitted by the surface 16.

The backlight assembly 10 of FIG. 1 is impractical for some applications of an LCD panel because of the width required by the parabolic reflector 12. Referring to FIG. 2, a basic backlighting arrangement of an LCD panel 42 of a low-profile PC 40 is shown. The backlight of the LCD panel 42 is provided by two thin fluorescent lights 44a and 44b that reside at the edges of the LCD panel 42 within the thin display portion 46 of the PC 40. Light foils and guides (not shown) as known in the art serve to distribute the light from the fluorescent lights 44a, 44b that enters the edge of the LCD panel 42 so that it is relatively uniformly distributed among the pixels of the LCD panel 42 and is directed toward the viewing surface of the LCD panel 42 shown in FIG. 2.

The state of the art usage of fluorescent lighting as a backlight is based on cold cathode fluorescent lamp (CCFL) technology with high frequency (HF) inverter circuits. A limitation that arises, however, is that these backlighting systems typically produce white light having a pre-set color point. The relative amounts of light output of various color components (for example, red, green and blue) by the CCFL cannot be regulated by means of the drive electronics or in any other way it is generated. (The relative amounts of light output of various colors, in particular, the relative amounts of red, green and blue light output, will be referred to below as the "color content". It is also related to the color point of the output in the backlight.) The CCFL backlight has limited potential in providing even rudimentary support of a video output, such as providing a variable color for a displayed image.

In addition, the CCFL would offer little potential for assistance in displaying a high quality image, such as a video feed with moving objects, on an LCD display. A typical response time of present LCDs (including drive circuitry) is on the order of 50 ms, whereas a video frame rate is on the order of 120 Hz, or a frame period on the order of 8.3 ms. Since the frame period is much less than the response time of the LCDs, the LCD panel suffers from certain artifacts in displaying fast moving video images. One way to reduce or remove the artifacts is to switch the LCD backlight on and off over a time interval that is a fraction of the frame period. However, present high frequency inverters and CCFLs have an on/off response time greater than 5 ms. Thus, the CCFL cannot be switched fast enough to eliminate the artifacts from the video displayed on the LCD display. Thus, CCFL technology offers limited potential as a high quality LCD panel backlight.

SUMMARY OF THE INVENTION

The invention comprises an LED backlight for an LCD display. The backlight may comprise, for example, an array or bank of red, green and blue ("RGB") LEDs positioned adjacent to the rear substrate of the LCD, along with associated drive circuitry (including drive electronics). It may alternatively comprise an array or bank of RGB LEDs positioned adjacent to one or more sides or edges of the LCD, along with associated drive circuitry. As known in the art, waveguides or other optical elements direct the red, green and blue light generated to each pixel of the LCD. The LED backlight provides a simpler design that facilitates thin panel manufacture. It may also reduce or eliminate the need for certain optical elements required in side or edge backlighting, also facilitating manufacture.

An RGB LED backlight can be driven to provide white light. This, of course, provides the necessary backlighting for the LCD. In addition, the LEDs of one color may be momentarily driven at relatively higher or lower levels (or for a longer duration), thus altering the color point of white light produced and/or enhancing or diminishing a particular color content in the backlight (or portions thereof) momentarily or for a longer duration. Also, the LEDs of three colors can be driven simultaneously at different levels and ratios, thus producing different white color points. Thus, the color point and/or color content of the LED backlight may be maintained and controlled during, for example, a change in intensity of the backlight. The LED backlight may also be used dynamically in the display of an image generated by a video image signal stream. From the video image signal stream, the total picture light intensity may be obtained via histogram operation on the luminance signal Y on each pixel. The LED based backlight driver uses the histogram data to adjust the backlight intensity accordingly, in order to have an extended contrast ratio. Accordingly, the color information of each pixel may be used to adjust the backlight color point in order to produce pictures with better color saturation and color balance.

The RGB LED backlight includes drive circuitry, which may comprise a power regulated converter. Preferably (for example, when used as a backlight for video signal streams) the RGB LED backlight may be driven by a fast pulse current mode, with or without DC bias. LEDs have an extremely fast response time, on the order of nanoseconds. Thus, the response time of the light output by an LED is practically limited by the response time of the drive power supplied to the LED. By regulating the output of the LEDs with a power circuit which has components that respond in the microsecond range, the red light (for example) emitted from the red LEDs can be dynamically controlled in the microsecond range. For example, the drive circuitry may pulse modulate red light output by the red LEDs over a few microseconds The eye of the viewer integrates the fast pulse output of the red LEDs as an average red light output. By separately adjusting the average light output of the red, green and blue LEDs, the color point and/or color content of the LED backlight may be varied. The light output of the red, green and blue LEDs may be independently controlled by separate controllers which supply, for example, an independent pulse modulation to the current supplied to the red, green and blue pixels of the LED array. Use of power regulated converters having a response time less than a millisecond to drive the LED backlight would be sufficient in many practical applications.

The color point and/or color content of the backlight is thus determined by the relative amounts of time the red, green and blue LEDs are driven and the intensities at which they are driven. As noted, three independent controllers may be used, one for the red pixels, one for green pixels and one for blue pixels, to provide the relative light outputs. (If the red, green and blue pixels are driven sequentially by the LED backlight, the eye also integrates the sequence of red, green and blue light into the white backlighting, or, as noted above, another background color.) Thus, the color point and/or color content of the backlighting provided by an LED backlight can be controlled and changed much faster (such as on the order of microseconds for a fast pulse converter) than a CCFL backlight. Thus, the color point and/or color content may be maintained by adjusting the relative light output of the colors to compensate for changes that may arise (for example, when the intensity of the LED backlight is changed or when the temperature of the LED backlight is changed).

The LED backlight also overcomes the disadvantages of the prior art CCFL backlights with respect to display of video data by an LCD display panel. As noted, the light output of the LED backlight has a response time on the order of microseconds using appropriate drive circuitry. Thus, the LED backlight may be readily switched on and off over a fraction of a video frame period, which is on the order of 8.3 ms (120 Hz frame rate), thus reducing or eliminating the artifacts created by the relatively slow response time of current LCD displays. In addition, because of the fast response time of the LED backlight, the color point and/or color content of the LED backlight may be adjusted to reflect the color point and/or color content of the video, something the CCFL backlight is incapable of. As noted, current LCDs have a response time on the order of 50 ms and thus cannot display every video frame, since a frame period is on the order of 8.3 ms. However, since the response time of the LED backlight may be on the order of microseconds, the output of the LED backlight may readily be adjusted for each video frame received. Thus, the color point and/or color content of the LED backlight may be adjusted to reflect the background color or color content of the image for each video frame received, even though the LCD cannot display all frames received. Thus, the LED backlight captures and uses some of the video data that is otherwise lost using current LCD displays.

In addition, an LED backlight may be used to provide the color required by each pixel of the LCD array, thus the color filters and sub-pixels of the LCD may be eliminated. For example, where the RGB LED backlight is located to the side or edge of the LCD panel, red, green and blue light may be generated in a rapid and repeating sequence and supplied (via associated waveguides and other optical components) to the pixels of the LCD. Each LCD pixel of the display may each be addressed for each successive color in the sequence to regulate the output of incident red, green and blue light in appropriate amounts to create the color in the image at the pixel location. The viewer's eye integrates the sequence of red, green and blue light metered by each LCD pixel to perceive the image on the screen.

The LED backlight may also generate one pre-set color point and/or color content, if the application calls for it. Thus, one or more controllers of the drive circuit may output a set of predetermined signals (stored, for example, in a memory) that control the LEDs to output one particular color. Alternatively, an LED backlight may be manufactured with the number of red, green and blue pixels adjusted (and/or the drive circuitry adjusted) to output a particular color point and/or color content and used as a backlight in particular applications. In addition, modular LED chips having a preset color content may be manufactured; the end user may assemble such modular LED chips in order to make a backlight having the color content desired. Also, the modular LED chips may have independent control terminals so that the color point generated from each modular LED chip can be controlled.

DETAILED DESCRIPTION

Figure 1:
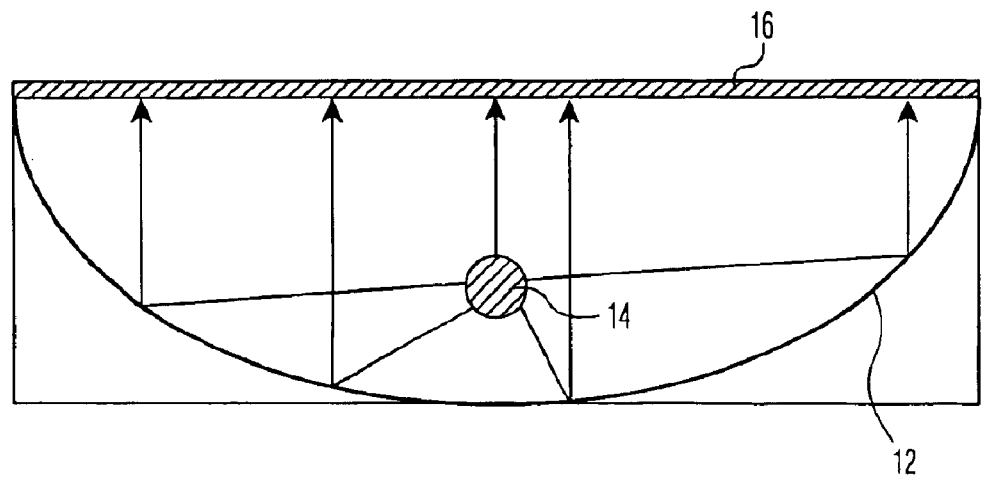
FIG. 1 is a representative drawing of a prior art backlight.
Figure 2:
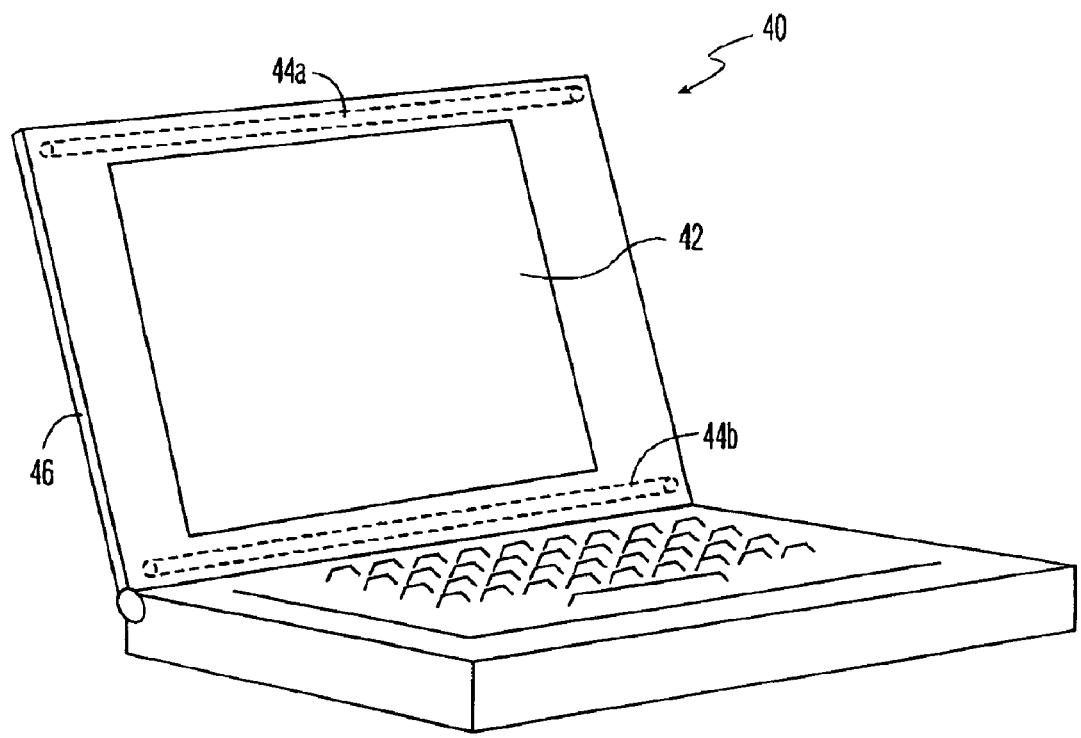
FIG. 2 is a representative drawing of a portable PC having a backlight.
Figure 3:
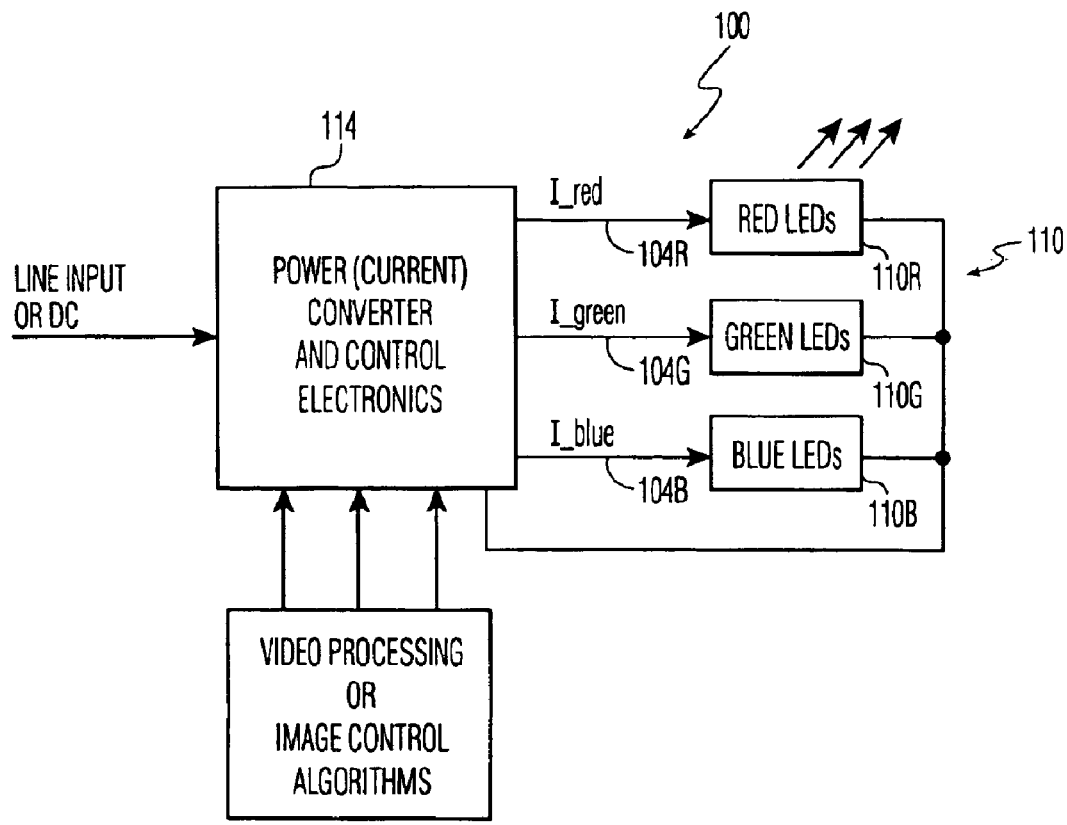
FIG. 3 is a drawing of an first embodiment in accordance with the present invention.

FIG. 3 is an embodiment of an LED backlight 100, including a circuit diagram of related driving circuitry, in accordance with the present invention. An array of RGB LEDs 110 are comprised of a sub-array of Red LEDs 110R, a sub-array of Green LEDs 100G and a sub-array of Blue LEDs 110B. The LEDs of sub-arrays 110R, 110G, 110B may be interleaved in a two-dimensional plane when, for example, the LED backlight is positioned adjacent the rear of the LCD panel. The LEDs of sub-arrays 110R, 110G, 110B may have other suitable spatial relationship. For example, the sub-arrays 110R, 110G, 110B may be comprised of one or more series of adjacent banks or strips of red, green and blue LEDs when, for example, the LED backlight is a side or edge backlight, where waveguides and/or other optical elements are used to guide the light generated to the back of the LCD pixels. Driving currents I_red 104R, I_green 104G and I_blue 104B are supplied to the red, green and blue sub-arrays of LEDs 110R, 110G and 110B, respectively, by power converter 114.

Power converter 114 may in general be a power regulated converter and may be, for example, a fast transient (pulse current) power converter with multiple independent outputs. For simplicity, the driving currents in FIG. 3 are shown as the three independent current inputs 104R, 104G, 104B to the Red, Green and Blue LED sub-arrays 110R, 110G, 110B. However, as known in the art, the connections of LED sub-array are typically more complex than a simple series or parallel connection with each LED in the sub-array. For example, if driving current 104R supplied to red sub-array 110R comprised a series connection with each red LED, then a failure of one of the LEDs in the sub-array would cause the sub-array to fail. On the other hand, if driving current 104R supplied to red sub-array 110R comprises a parallel connection with each LED in the sub-array, then a short circuit in one of the LEDs may create a short in others. Thus, the current input 104R (as well as 104G, 104B) is usually comprised of a number of redundant connections to different groupings of red LEDs in the sub-array 110R, so that a failure or short of one red LED will (at most) only affect the other red LEDs in the same group and will not affect the red LEDs in other groups.

Figure 3A:
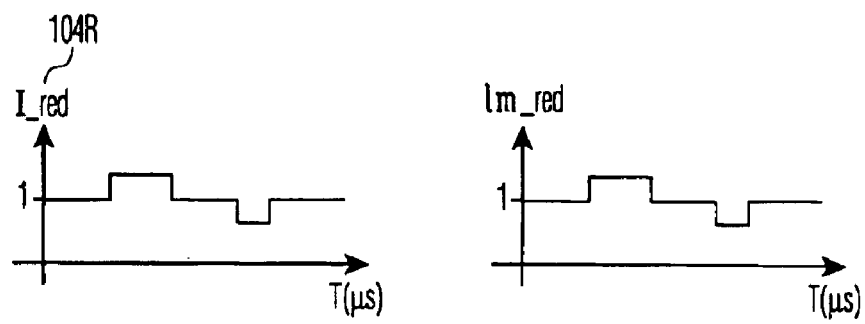
FIG. 3a is a graph showing representative current input and light output of the embodiment of FIG. 3.

A line input or DC provides power to the power converter and control electronics 114, which processes and converts the provided power into current inputs 104R, 104G, 104B. Video processing input or image control algorithms are also supplied as input to the control electronics in power converter 114. As noted above, the light output of the LEDs have a fast response time (on the order of nanoseconds) and are thus usually limited to the response time of power converter and control electronics 114, namely the time that the power converter and control electronics 114 can generate a change in current inputs 104R, 104G, 104B to the LED sub-arrays 110R, 110G, 110B after receipt or initiation of the control signal. For a typical fast transient (pulse current) power converter with multiple independent outputs, the current outputs 104R, 104G, 104B may be changed on the order of microseconds. Thus, as shown in FIG. 3a, the amplitude of current output I_red 104R is shown as moving above and below a (normalized) steady state output of 1 for a time T in the microsecond range, as regulated by the power converter 114. Since the LED response time is in the nanosecond range, the corresponding light output of the red LED sub-array 110R lm_red is shown to vary in substantially the same manner as the driving current I_red. 104R. (The light output graph may alternatively represent the light output of a particular red LED in the sub-array 110R.)

The current outputs I_red 104R, I_green 104G, I_blue 104B may be controlled by power converter so that each sub-array 110R, 110G, 110B contributes the requisite amount of red, green and blue light so that LED array 110 outputs controlled white light. The intensity of the white light output may likewise be controlled through the levels of the current outputs 104R, 104G and 104B.

In addition, the LED backlight 100 can be used to generate a colored backlight. For example, a red backlight may be created by power converter providing driving current I_red 104R but not I_green 104G and I_blue 104B. Other colors, hues and intensities may also be created by the power converter, providing the requisite proportional amount of currents I_red 104R, I_green 104G and I_blue 104B, for example, based on input provided by video processing or image control algorithms. Where the red, green and blue light of sub-arrays 110R, 110G, 110B are generated sequentially, the viewer will perceive the output as white light because of the speed of the power converter, on the order of microseconds.

The color point and/or color content may drift over time, or may be altered by something else, such as a change in intensity. The driving currents I_red 104R, I_green 104G and I_blue 104B may be adjusted by the power converter and control electronics to maintain the color point and/or color content of the resulting light output by the backlight. The power converter may optionally be supplied with feedback reflecting the color point and/or color content of the light output by an optical sensor. In addition, the fast response time (on the order of microseconds) allows the backlight output to be switched on and off during the average duration of a video frame (8.3 ms frame period for a 120 Hz frame rate). Thus, the LED backlight may be used to eliminate artifacts that arise on current LCD displays when displaying fast moving video.

The fast (microsecond) output of LED backlight 100 of FIG. 3 may also be used with video processing or image control algorithms, such as previously described. As noted, the current outputs I_red 104R, green 104G, I_blue 104B may be varied on the order of microseconds, with a commensurate temporal reaction in light outputs from the LED sub-arrays 110R, 110G, 110B (or portions thereof). Thus, the video processing or image control algorithms may control the power converter 114 and the outputs 104R, 104G, 104B such that the backlighting hues, intensities, etc., provide or supplement the image output of the LCD display. In general, the color point and/or color content may be adjusted to reflect the background light of the image or other lighting level related to the image. For video display, for example, the backlighting may be changed from a light blue (corresponding, for example, to an outdoor image displayed on the LCD) to a dark brown (corresponding, for example, to a interior scene) over an interval on the order of microseconds and thus can be readily changed from one video frame to another (on the order of 8.3 ms for a 120 Hz frame rate). This provides a smoother partial visual transition from one scene to another on the display that cannot be captured by the LCD itself, which has a slower response (refresh) rate that is on the order of 50 milliseconds. Alternatively, the backlight may be set at a particular color point and/or color content for display of a number of video frames or a static or slowly changing image.

While FIG. 3a shows the current and resulting light output to the LEDs being controlled to provide a change in the amplitude in the pulse around a norm) or a "pulse-amplitude modulation", the currents and resulting light output may also be controlled to provide for pulses of different widths (thus a "pulse-width-modulation") and/or changes in the number of pulses per unit time (thus a "pulse-frequency-modulation"). These different types of modulations, or combinations thereof, may be used for image enhancement, contrast control, color compensation, etc.

Figure 4:
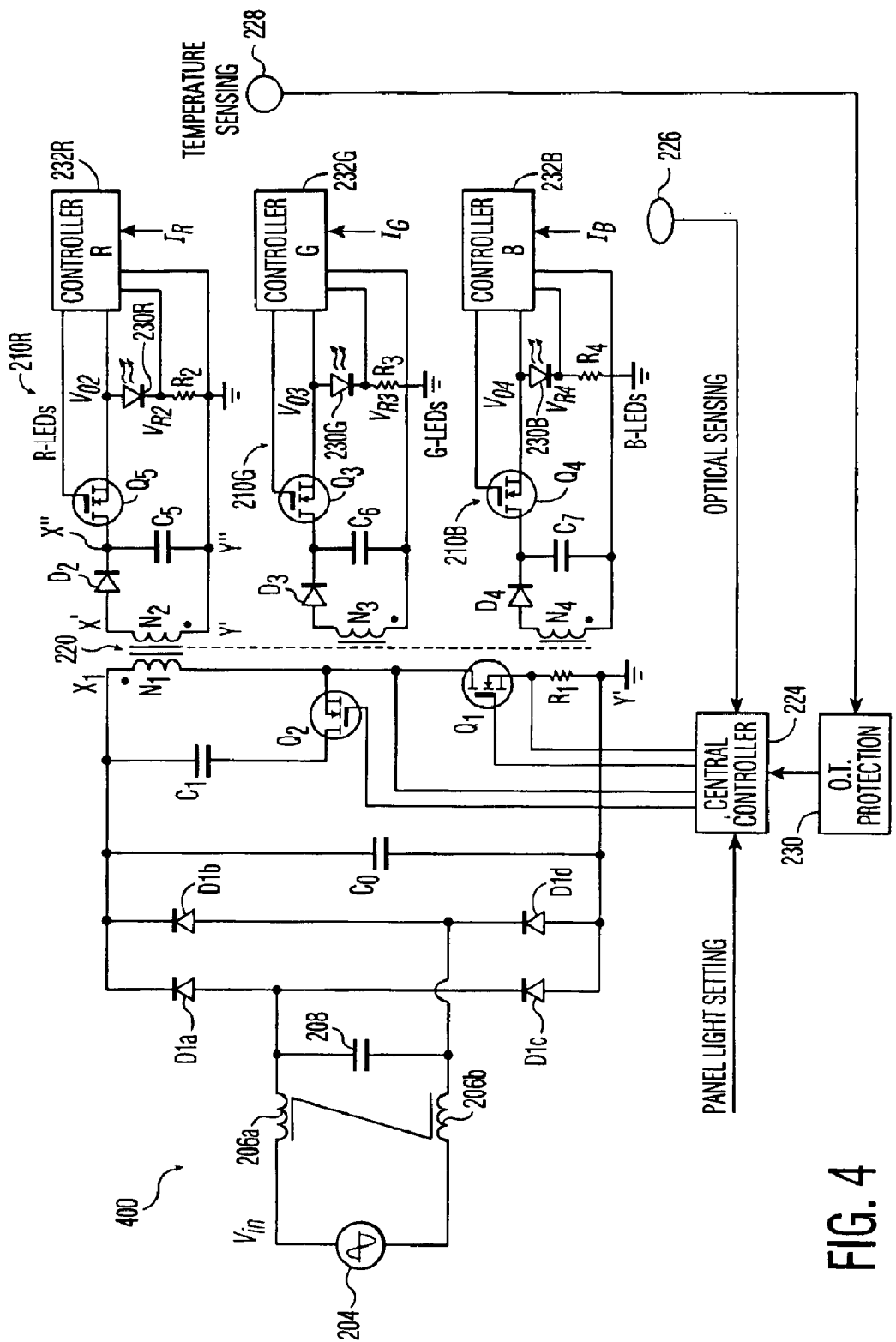
FIG. 4 is a drawing of a second embodiment in accordance with the present invention.

FIG. 4 depicts a second exemplary embodiment of an LED backlight according to the invention. The drive circuitry of FIG. 4 will be readily recognized by one skilled in the art as comprising a multiple output, clamped mode flyback power converter. An ac voltage source 204 is connected in the manner shown in FIG. 4 with inductors 206a, 206b and capacitor 208, thus providing an EMI suppression filtering of the power converter. Diodes $D_{1a}$, $D_{1b}$, $D_{1c}$, $D_{1d}$ comprise a full wave rectification bridge circuit which provides full wave rectification of the ac input of ac source 204. Capacitor $C_o$ smooths the rectified ac signal further into a first order dc voltage that is provided across points X-Y of FIG. 4.

The converter circuitry between points X and Y of FIG. 4 include the primary winding N1 of a multiple output transformer 220, switch $Q_1$ and resistor $R_1$. (Resistor $R_1$ has a low resistance to provide current sensing for controller 224; because it has a low resistance, its influence on the operative aspects of the circuit is minimal and will thus be ignored in the description.) Multiple output transformer 220 has three secondary windings N2, N3 and N4 that are each magnetically coupled to the primary winding. Secondary windings N2, N3, and N4 are included in LED sub-array circuits 210R, 210G, 210B of an RGB LED array, described further below. (The electronic components and circuitry associated with the entire circuit shown in FIG. 4 provides the driving electronics of the LEDs. However, LED sub-arrays 210R, 210G, 210B are separately labeled and referred to below, for ease of description.) As known in the art, capacitor $C_1$ and switch $Q_2$ comprise the clamping feature of the circuit.

Figure 4A:
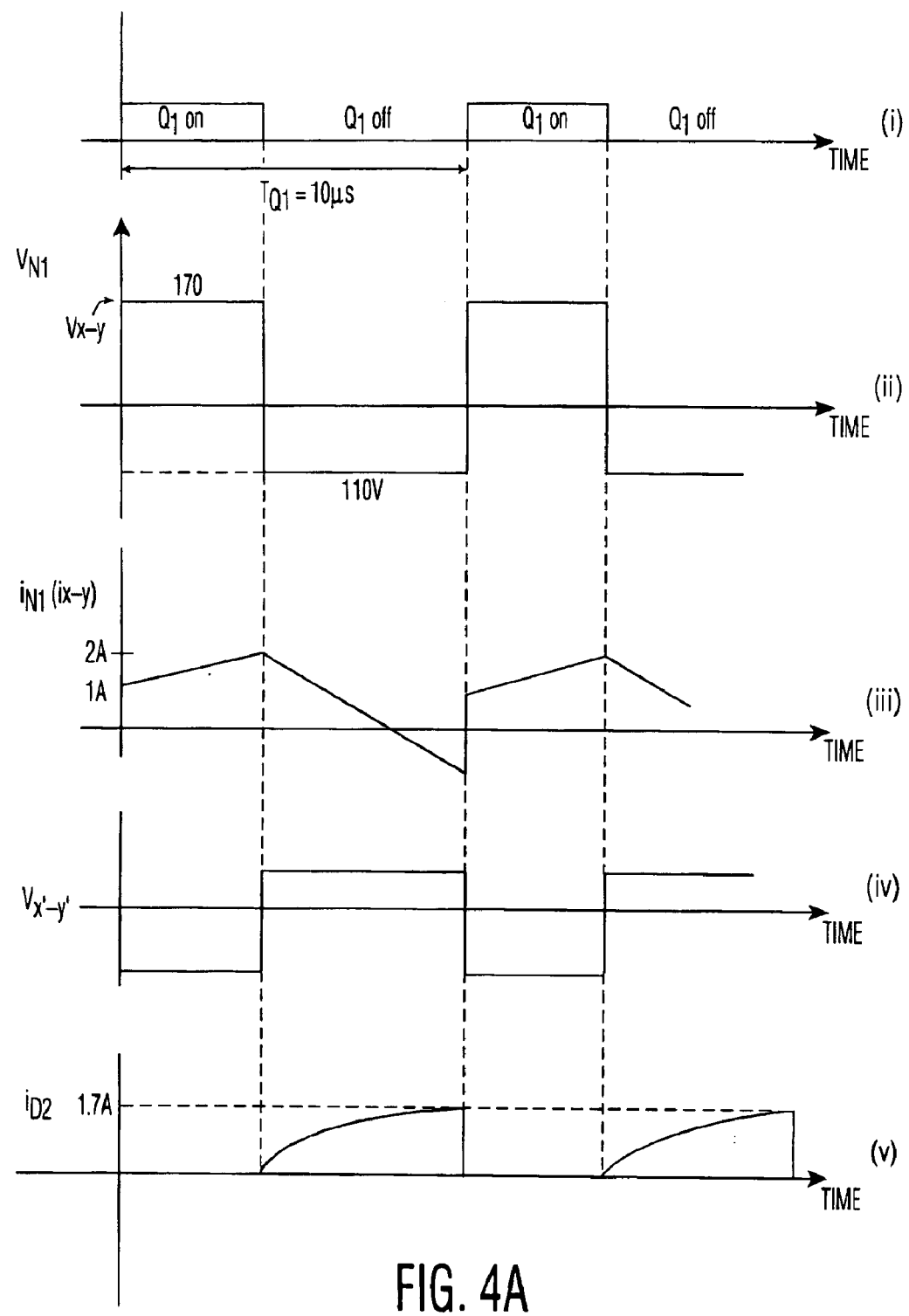
FIG. 4a shows a number of waveforms for the circuit of FIG. 4.

As known in the art, the combination of primary winding N1 of multiple output transformer 220 and switch $Q_1$ comprise the flyback converter aspects of the power converter. Switch $Q_1$ is cycled on and off by central controller 224. When $Q_1$ is on (closed), the rectified voltage applied across X-Y drops across primary winding N1; when $Q_1$ is off (open), the rectified voltage drops across switch $Q_1$. Referring to FIG. 4a, waveform i represents two switching cycles of switch $Q_1$, each having a period on the order of 10 microseconds ($\mu$s). The voltage $V_{N1}$ across primary winding N1 for the $Q_1$ "on" portion of the cycles equals the rectified ac voltage applied across X-Y (since, as noted, the voltage drop across $R_1$ is ignored for the discussion). This is shown in waveform ii, where $V_{N1}$ equals $V_{X-Y}$ during the $Q_1$ on half cycle and has a magnitude of approximately 170V. During the $Q_1$ "on" portion, current flows in the primary winding N1, shown in waveform iii as $i_{N1}$, which is also the current between points X and Y, $i_{X-Y}$.

When switch $Q_1$ is "off", the circuit between points X and Y is open. There is a negative voltage across primary winding N1 induced by the secondary windings N2–N4 (see waveform ii) when $Q_1$ is off.

During the "on" portions of a switching cycle of switch $Q_1$ a voltage $V_{X'-Y'}$ is created across points X' and Y' in LED sub-array 210R due to the induced voltage in secondary winding N2 created by current $i_{N1}$, in the primary winding N1. (Like voltages are created in the other secondary windings N3, N4, but secondary winding N2 and its associated sub-array circuit 210R will be focused on.) By the dot convention of N2, the current $i_{N1}$ induces a negative voltage $V_{X'-Y'}$ when $Q_1$ is on, as shown in waveform iv of FIG. 4a. Because $V_{X'-Y'}$ applied to secondary circuit 210R is negative, diode $D_2$ prevents a current flow in the sub-array 210R when $Q_1$ is on, as shown in waveform v of FIG. 4a. However, when $Q_1$ is on, magnetic energy is stored in the magnetizing and leakage inductances of transformer 22. This magnetic energy is released during the half-cycle when $Q_1$ is off, thus applying a positive voltage $V_{X'-Y'}$ to secondary circuit 210R, as shown in waveform iv. Because voltage $V_{X'-Y'}$ is positive, a current flows through diode $D_2$ when $Q_1$ is off, as shown in waveform v of FIG. 4a.

Figure 4B:
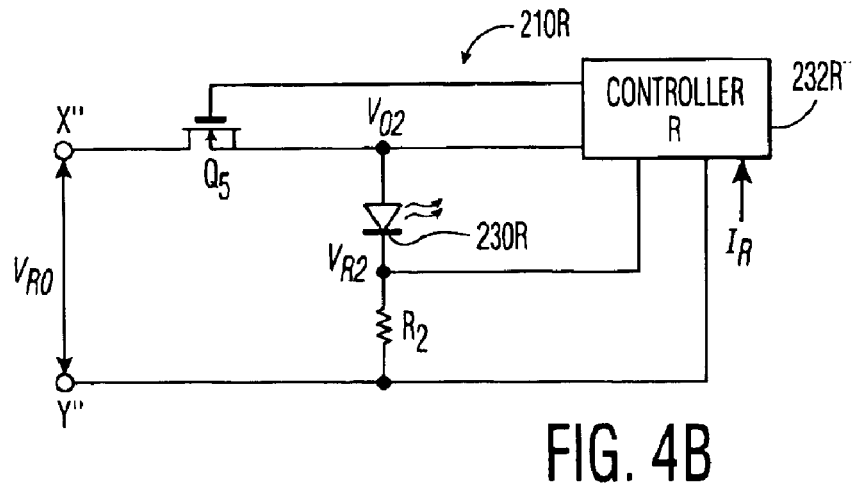
FIGS. 4b–4d are equivalent portions of the circuit of FIG. 4.

When current flows through diode $D_2$ during the $Q_1$ "off" half-cycle as shown in waveform v of FIG. 4a, it acts to charge capacitor $C_5$. During the $Q_1$ "off" portion of the half-cycle, the built up charge on capacitor $C_5$ tends to sustain a relatively constant voltage of $V_{RO}$ across points X"-Y" of LED sub-array 210R. Thus, focusing on LED sub-array 210R, the entire circuit to the left of points X"-Y" may be replaced with a voltage $V_{RO}$, as represented in FIG. 4b. (The components shown in FIG. 4b are part of the power converter and thus the drive circuitry of the red LEDs, but are also recognized as one skilled in the art as the load of the power converter.) The level of the voltage $V_{RO}$ applied to LED sub-array 210R is a function of (among other things), the duty cycle of switch $Q_1$ (a measure of the lengths of the on and off portions of the switching cycle, such as that shown in waveform i of FIG. 4a, which is controllable by controller 224) and the turns ratio between the primary winding N1 and the secondary winding N2.

Figure 4C:
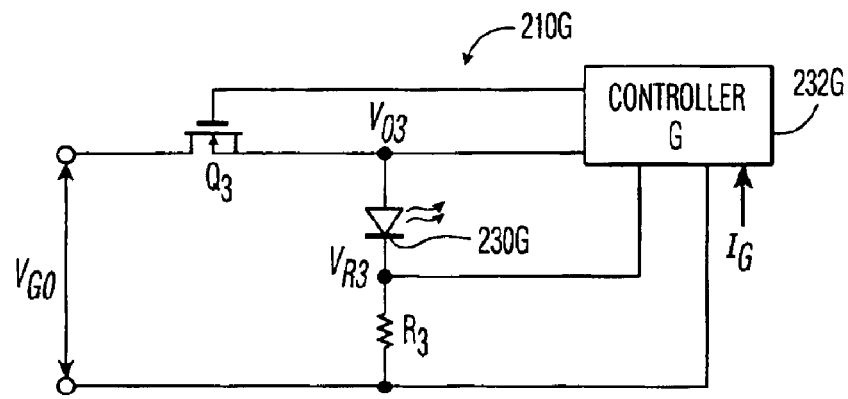
Figure 4D:
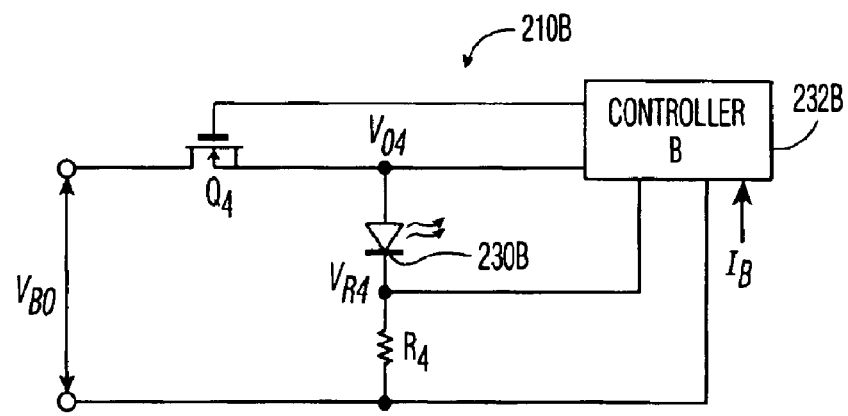

Green and Blue LED sub-arrays 210G, 210B may likewise be represented as shown in FIGS. 4c and 4d having applied voltages of $V_{GO}$ and $V_{BO}$, respectively, generated by the circuitry of FIG. 4 as described above. The voltage $V_{GO}$ applied to LED sub-array 210G is a function of the duty cycle of switch $Q_1$ and the turns ratio between the primary winding N1 and the secondary winding N3. Similarly, the voltage $V_{BO}$ applied to LED sub-array 210B is a function of the duty cycle of switch $Q_1$ and the turns ratio between the primary winding N1 and the secondary winding N4. As described in further detail below, the applied voltages $V_{RO}$, $V_{GO}$, $V_{BO}$ establish a maximum level of light output by each LED sub-array 210R, 210G and 210B, respectively.

Since the turns ratios between the primary winding N1 and the secondary windings N2, N3, N4 of transformer 220 are fixed, the voltages $V_{RO}$, $V_{GO}$, $V_{BO}$ applied to LED sub-arrays 210R, 210G and 210B, respectively, are controlled by controller 224 by controlling the duty cycle of switch $Q_1$. Since voltages $V_{RO}$, $V_{GO}$, $V_{BO}$ establish the maximum level of light output of LED sub-arrays 210R, 210G and 210B, respectively, the maximum level of light output by LED sub-arrays 210R, 210G and 210B, respectively, are likewise controlled by controller 224 (FIG. 4) by controlling the duty cycle of switch $Q_1$. A "panel light setting" input to central controller 224 (controlled, for example, by a user or other input, including video input) adjusts the duty cycle of $Q_1$ and thus the maximum light output of LED sub-arrays 210R, 210G and 210B.

An optical sensor 226 also provides a optical sensing feedback signal to the central controller 224 that may be used to adjust the duty cycle of $Q_1$ and thus the maximum level of light output of LED sub-arrays 210R, 210G and 210B. Similarly, a temperature sensor 228 also provides a temperature sensing feedback signal to the central controller 224 via an over-temperature (O.T.) protection unit 230 that may be used to adjust the maximum level of light output of LED sub-arrays 210R, 210G and 210B (and thus temperature) by adjusting the duty cycle of $Q_1$.

As noted, LED sub-arrays 210R, 210G, 210B generate the light output of the LED backlight 200 using the applied voltages $V_{RO}$, $V_{GO}$, $V_{BO}$, respectively, as represented in FIGS. 4b–4d. Since each LED sub-array 210R, 210G, 210B has like components that are similarly labeled in FIGS. 4b–4d, for ease of description LED sub-array 210R in FIG. 4b will again be described in greater detail. Like descriptions apply to the green and blue LED sub-arrays 210G, 210B. One LED 230R is used in FIG. 4b to represent all of the LEDs in the sub-array 210R. Thus, the other red LEDs in sub-array 210R have power supplied and are regulated in like manner as LED 230R. As noted in the description of FIG. 3, the actual electrical configuration of the red LEDs in the sub-array 210R may have redundancies, etc.

Assuming that switch $Q_5$ of FIG. 4b is turned on (and maintained on for a sustained interval), the applied voltage $V_{R0}$ creates a maximum current $I_{MAX}$ through red LED 230R, flowing from point X", through closed switch $Q_5$, red LED 230R and resistor $R_2$, to point Y". The current $I_{MAX}$ through LED 230R is generated by a full application of $V_{R0}$ to the circuit and thus provides the maximum level of light output by red LED 230R. The current through red LED 230R and thus the light output of red LED 230R, may be varied by switching switch $Q_5$ on and off. When $Q_5$ is switched off, the current supplied by applied voltage $V_{R0}$ is interrupted and the current immediately falls to zero.

Figure 5:
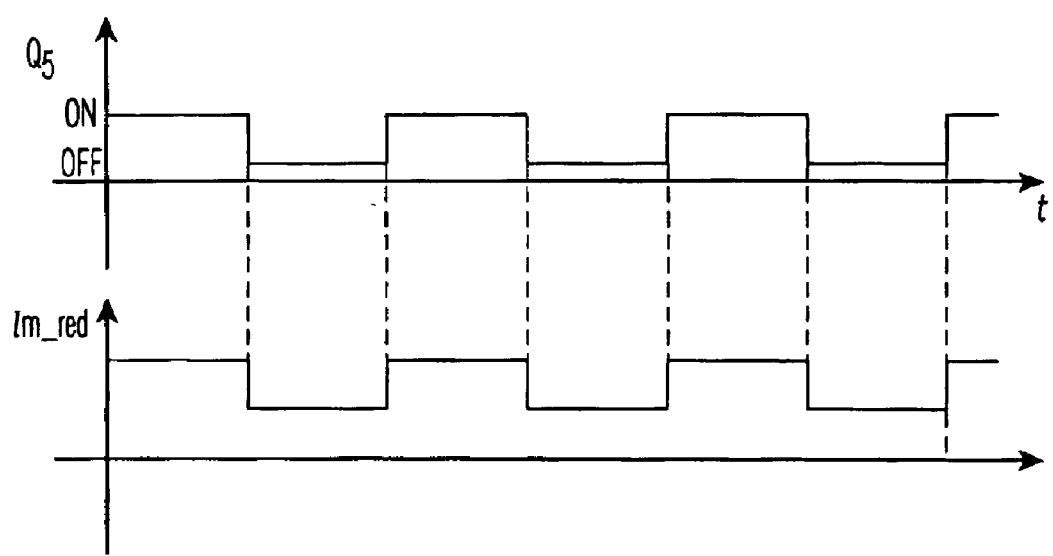
FIG. 5 is a waveform of a pulse modulated light output of the circuit of FIG. 4.

Thus, switching $Q_5$ on and off in a cyclical manner causes the current through red LED 230R to rise and fall in a cyclical manner, thus resulting in a cyclical rise and fall in the light output of red LED 230. Controller 232R independently controls the switching of switch $Q_5$. The duty cycle set by controller 232R controls the amount of time that $Q_5$ is turned on and off in a switching cycle. Controller 232R and switch $Q_5$ have response times on the order of microseconds; thus, the duty cycle may be on the order of microseconds. The cyclical switching establishes an average current through red LED 230R at a point below $I_{MAX}$ and, consequently, an average light output below the maximum level. Because of the fast switching duty cycle (on the order of microseconds), the eye integrates the output of the red LED 230R as the average value.

Where the duty cycle of $Q_5$ is constant, there is thus a pulse amplitude modulation of light output of red LED 230, an example of which is shown in FIG. 5. (In the example of FIG. 5, switch $Q_5$ is operated in the active region so that the current through the LED is altered from a high to a low value, but not completely turned off. Thus, the light output varies between a high and low value.) Other switching patterns may provide other types of light modulation. For example, altering the frequency of the duty cycle may provide a pulse-frequency modulation, while altering the relative values of the on and off portions of the duty cycle may provide a pulse-width modulation. By operating switch $Q_5$ in the active region, the magnitude of the current going through LED can be modulated. Combinations of different modulations are also possible to achieve a desired backlighting effect.

In like manner, the light output of green and blue LED sub-arrays 210G, 210B are independently controlled by independent controllers 232G, 232B. Thus, independent controllers 232R, 232G, 232B determine the relative output of red, green and blue light, respectively, output by LED sub-arrays 210R, 210G, 210B, respectively. Since the duty cycle of each controller (and the resulting cyclical change of light output) is on the order of microseconds, the eye integrates the separate color outputs into a resulting color composite. Thus, controllers 232R, 232G, 232B may be used to regulate the color point and/or color content of white light generated. In addition, they may generate a backlight have a color (i.e., non-white) hue.

The switching times of $Q_5$, $Q_3$ and $Q_4$ are on the order of a microsecond. (It was previously noted that the "off" portion of the duty cycle of $Q_1$, which may be used to adjust the overall intensity of the LED backlight, is likewise on the order of microseconds.) Thus, the color point and/or color content of the backlight output by LED sub-arrays 210R, 210G, 210B can be changed (or maintained) on the order of microseconds.

As noted, the LED output of the red, green and blue LED sub-arrays 210R, 210G, 210B are independently controlled by controller R 232R, controller G 232G and controller B 232B, respectively. Current reference signals $I_R$, $I_G$ and $I_B$ may be provided to controller R 232R, controller G 232G and controller B 232B, respectively, for example, by a DSP control board loaded with control algorithms. Current reference signals $I_R$, $I_G$ and $I_B$ may also be generated, for example, by a microcontroller programmed with one or more specific applications, or by a video feed. Controllers 232R, 232G, 232B separately control the red, green and blue light output of LED sub-arrays 210R, 210G, 210B each in the manner described above, as determined by input levels $I_R$, $I_G$ and $I_B$. The backlighting hue and composition and color output by the backlight 200 will depend on the mix of red, green and blue light levels as determined by input levels $I_R$, $I_G$ and $I_B$. Feedback to the controllers, such as the voltage across the LED 230R (i.e., $V_{o2}-V_{R2}$) and the voltage across resistor $R_2$ (i.e., $V_{R2}$–gnd) may be fed back to controller 232R to adjust switching of $Q_5$ so that the current through LED 230R is in accordance with signal $I_R$. Like feedback signals are used in the other controllers 232G, 232B. Changes in the current signals $I_R$, $I_G$ and $I_B$, which may be on the order of 8.3 ms if, for example, they represent the background light level of a video frame input at a 120 Hz frame rate, can be effected by controllers 232R, 232G, 232B by changing the light output of LEDs 230R, 230G, 230B, since they have a response time on the order of microseconds as described above.

The LED backlight of FIG. 4 may thus be switched on and off within a fraction of a frame period of a video signal (typically a 8.3 ms frame period for a video frame rate of 120 Hz). The LED backlight may thus be used to eliminate artifacts that arise when video is displayed by current LCD displays (typically having a response time on the order of 50 ms). The light output of the sub-arrays of the LED backlight of FIG. 4 may also be adjusted so that the color point and/or color content is maintained over time. (Thus, if there is a change in color point or color content due to drift, a change in intensity, or other factor, the color point and/or color content may be adjusted back to the desired point on the order of microseconds.) In addition, the fast response time allows the color point and/or color content output by the LED display to be changed for every video frame to provide, for example, the background light level or composition desired. This allows the LED display to provide some of the video information displayed. In addition, the color point and/or color content may be changed for select video frames or segments of video frames. For example, a commercial for a cold beverage may use a "cooler" color temperature (color point) for the backlight. The color content and/or color point may also be adjusted, of course, for a static or slow changing image displayed on the LCD (such as an internet page, or a word processing document).

As noted above, the LED backlight may also be used in other than a traditional backlighting capacity for an LCD display. The LED backlight may supply the color content for the portion of the image displayed by individual pixels of the LCD display, thus eliminating the need to have color filters for the pixels of the LCD. It also eliminates the need for having separate red, green and blue "sub-pixels" for each pixel in the LCD array, thus offering better resolution.

For example, where the LED backlight is a side or edge backlight, waveguides and/or other optical elements guide the red, green and blue light generated from the LED sub-arrays to the rear of the LCD pixels. The controllers of the power converters (for example, controllers 232R, 232B, 232C of FIG. 4) may be programmed, for example, to provide a repeating cycle of red, green and blue light at predetermined levels from the respective sub-arrays to the pixels of the LCD display. Each color in the cycle is sustained by the respective controller for an interval approximately equal to the response time of the LCD pixels. Thus, for each incident color, each LCD pixel in the display may be addressed to transmit the amount of that color for the portion of the image to be displayed at the pixel. Over each cycle of red, green and blue output by the LED backlight, each LCD pixel is thus addressed to transmit the requisite amount of red, green and blue light in the image to be displayed at that pixel. The viewer's eye integrates the sequence of red, green and blue light metered by the LCD pixel and perceives the image color.

As an exemplary illustration of the working principle, such use of LED backlights as providing color content for the displayed image (thus replacing the need for color filters) is achievable using LCDs. As noted, typical LCD response times are currently on the order of 50 milliseconds. Thus, the LED backlight may provide red, green and blue light to the LCD pixels, each for a duration of 50 milliseconds (i.e., a repeating cycle of 150 ms). (The power converters of FIGS. 3 and 4 may, for example, be controlled to turn off green and blue sub-arrays while the red output is generated for a 50 millisecond interval, etc. Thus, for this application alone, the response time of the power converter need only be on the order of 50 milliseconds or, generally, the response time of the LCD.) For the 50 ms interval of red light output by the LED backlight, each LCD pixel is addressed to allow transmission of the proportion of red light corresponding to the red content of the image at that pixel. For the subsequent 50 ms interval of green light, each LCD pixel is addressed to allow transmission of the proportion of green light corresponding to the green content of the image at that pixel. Finally, for the subsequent 50 ms of blue light, each LCD pixel is addressed to allow transmission of the proportion of blue light corresponding to the blue content of the image at that pixel. Thus, over cycles of 150 millisecond intervals, the requisite proportion of red, green and blue light corresponding to the image to be displayed is output by each pixel, and the eye integrates the pixel output into the corresponding color of the image. With faster LCD response times, the 150 millisecond interval will decrease and the integration by the eye will provide for even sharper images. The addressing of each LCD pixel may correlate, for example, to frames of a video feed.

Although illustrative embodiments of the present invention have been described herein with reference to the accompanying drawings, it is to be understood that the invention is not limited to those precise embodiments, but rather it is intended that the scope of the invention is as defined by the scope of the appended claims.

What is claimed is:

1. A LED backlight for an LCD display, comprising:
 a primary circuit for generating a primary voltage;
 a first secondary circuit coupled to said primary circuit for receiving a first secondary voltage as a function of the primary voltage, said first secondary circuit including
  a first sub-array of LEDs of a first color,
  a first sub-array switch operable in a first ON state for allowing a flow of a first LED current through said first sub-array of LEDs, the first LED current being a function of said first secondary voltage, and
  a first sub-array controller for controlling an operation of said first switch in the first ON state; and
 a second secondary circuit coupled to said primary circuit for receiving a second secondary voltage as a function of the primary voltage, said second secondary circuit including
  a second sub-array of LEDs of a second color,
  a second sub-array switch operable in a second ON state for allowing a flow of a second LED current through said second sub-array of LEDs, the second LED current being a function of said second secondary voltage, and
  a second sub-array controller for controlling an operation of said second switch in the second ON state,
   wherein said first sub-array controller controls the operation of said first sub-array switch in the first ON state and said second sub-array controller controls the operation of said second sub-array switch in the second ON state in a mutually exclusive manner.

2. The LED backlight of claim 1,
 wherein said first sub-array controller controls the operation of said first switch in the first ON state as a function of a first feedback voltage indicative of a first LED voltage across said first sub-may of LEDs.

3. The LED backlight of claim 2,
 wherein said second sub-array controller controls the operation of said second switch in the second ON state as a function of a second feedback voltage indicative of a second LED voltage across said second sub-array of LEDs.

4. The LED backlight of claim 1,
 wherein said first sub-array controller controls the operation of said first switch in the first ON state as a function of a first reference current indicative of a first commanded light output of said first sub-array of LEDs.

5. The LED backlight of claim 4,
 wherein said second sub-array controller controls the operation of said second switch in the second ON state as a function of a second reference current indicative of a second commanded light output of said second sub-array of LEDs.

6. The LED backlight of claim 1,
 wherein said first sub-array controller modulates the first LED current when said first sub-array switch is operating in the first ON state.

7. The LED backlight of claim 6,
 wherein said second sub-array controller modulates the second LED current when said second sub-array switch is operating in the second ON state.

8. The LED backlight of claim 1,
 wherein said first sub-array controller controls at least one of a first pulse-amplitude modulation, a first pulse-width modulation, and a first pulse-frequency modulation of the first LED current when said first sub-array switch is operating in the first ON state.

9. The LED backlight of claim 8,
 wherein said second sub-array controller controls at least one of a second pulse-amplitude modulation, a second pulse-width modulation, and a second pulse-frequency modulation of the second LED current when said second sub-array switch is operating in the second ON state.

10. The LED backlight of claim 1,
 wherein said first secondary voltage is applied between a first point and a second point;
 wherein said first sub-array switch includes a first current path for connecting said first point to said first sub-array of LEDs when said first sub-array switch is operating in the first ON state;
 wherein said first sub-array switch further includes a first control input for controlling the operation of said first sub-array switch in the first ON state; and wherein said first sub-array controller is connected to said first control input to thereby control the operation of said first sub-array switch in the first ON state.

11. The LED backlight of claim 10,
wherein said second secondary voltage is applied between a third point and a fourth point;
wherein said second sub-array switch includes a second current path connecting said third point to said second sub-array of LEDs when said second sub-array switch is operating in the second ON state;
wherein said second sub-array switch further includes a second control input for controlling the operation of said second sub-array switch in the second ON slate; and
wherein said second sub-array controller is connected to said second control input to thereby control the operation of said second sub-array switch in the second ON state.

12. The LED backlight of claim 2,
wherein said first secondary voltage is applied between a first point and a second point;
wherein said first sub-array switch includes a first current path for connecting said first point to said first sub-array of LEDs when said first sub-array switch is operating in the first ON state;
wherein said first sub-array switch further includes a first control input for controlling the operation of said first sub-array switch in the first ON state; and
wherein said first sub-array controller is connected to said first control input to thereby control the operation of said first sub-array switch in the first ON state.

13. The LED backlight of claim 12,
wherein said first secondary circuit further includes a resistor connected to said first sub-array of LEDs and said first sub-array controller to facilitate a determination of the first feedback voltage by said first sub-array controller.

14. The LED backlight of claim 3,
wherein said first secondary voltage is applied between a first point and a second point;
wherein said first sub-array switch includes a first current path for connecting said first point to said first sub-array of LEDs when said first sub-array switch is operating in the first ON state;
wherein said first sub-array switch further includes a first control input for controlling the operation of said first sub-array switch in the first ON stale;
wherein said first sub-array controller is connected to said first control input to thereby control the operation of said first sub-array switch in the first ON state.

15. The LED backlight of claim 14,
wherein said first secondary circuit further includes a resistor connected to said first sub-array of LEDs and said first sub-array controller to facilitate a determination of the first feedback voltage by said first sub-array controller.

16. The LED backlight of claim 14,
wherein said second secondary voltage is applied between a third point and a fourth point;
wherein said second sub-array switch includes a second current path for connecting said third point to said second sub-array of LEDs when said second sub-array switch is operating in the second ON state;
wherein said second sub-array switch further includes a second control input for controlling the operation of said second sub-array switch in the second ON state; and wherein said second sub-array controller is connected to said second control input to thereby control the operation of said second sub-array switch in the second ON state.

17. The LED backlight of claim 16,
wherein said first secondary circuit further includes a first resistor connected to said first sub-array of LEDs and said first sub-array controller to facilitate a determination of the first feedback voltage by said first sub-array controller; and
wherein said second secondary circuit further includes a second resistor connected to said second sub-array of LEDs and said second sub-array controller to facilitate a determination of the second feedback voltage by said second sub-array controller.

18. The LED backlight of claim 1, further comprising:
a transformer including a first magnetic coupling of a primary winding and a first secondary winding,
wherein said primary circuit is connected to said primary winding to thereby apply the primary voltage across said primary winding whereby the first secondary voltage is applied across said first secondary winding, and
wherein said first secondary circuit is connected to said first secondary winding.

19. The LED backlight of claim 1,
wherein said transformer further includes
a first magnetic coupling of a primary winding and a first secondary winding, and
a second magnetic coupling of said primary winding and a second secondary winding;
wherein said primary circuit is connected to said primary winding to thereby apply the primary voltage across said primary winding whereby the first secondary voltage is applied across said first secondary winding and the second secondary voltage is applied across said second secondary winding; and
wherein said first secondary circuit is connected to said first secondary winding and the second secondary circuit is connected to said second secondary winding.

20. The LED backlight of claim 1, further comprising:
a third secondary circuit coupled to said primary circuit for receiving a third secondary voltage as a function of the primary voltage, said third secondary circuit including
a third sub-array of LEDs of a third color,
a third sub-array switch operable in a third ON state for allowing a flow of a third LED current through said third sub-array of LEDs, the third LED current being a function of said third secondary voltage, and
a third sub-array controller for controlling an operation of said third switch in the third ON state,
wherein said first sub-array controller controls the operation of said first sub-array switch in the first ON state, said second sub-array controller controls the operation of said second sub-array switch in the second ON state, and said third sub-array controller controls the operation of said third sub-array switch in the thud ON state in a mutually exclusive manner.

* * * * *